United States Patent

Lindberg

[15] 3,692,784
[45] Sept. 19, 1972

[54] N-(PHENYLALKYL)-ACYLAMIDE DERIVATIVES

[72] Inventor: Ulf Henrik Anders Lindberg, Sodertalje, Sweden

[73] Assignee: Aktiebolaget Astra, Sodertalje, Sweden

[22] Filed: July 1, 1969

[21] Appl. No.: 838,313

[30] Foreign Application Priority Data

July 16, 1968    Great Britain..........33,867/68

[52] U.S. Cl........260/247.2, 260/293.76, 260/295 Q, 260/295 AM, 260/326.3, 260/456 A, 260/471 A, 260/553 A, 260/562 N, 260/570.5, 260/612 D, 260/613 D, 260/650 R, 260/668 R, 424/248, 424/267, 424/274, 424/324
[51] Int. Cl............................................C07c 103/50
[58] Field of Search........260/562, 247.2, 326.3, 294, 260/293, 76

[56] References Cited

UNITED STATES PATENTS

| | | | |
|---|---|---|---|
| 2,678,948 | 5/1954 | Bruce et al. | 260/562 |
| 2,768,166 | 10/1956 | Bruce et al. | 260/294 |

OTHER PUBLICATIONS

Chiavarelli et al., Gazzetta Chimica Italiana, Vol. LXXXI, pp. 89–97 (1951).
Dalal et al., J. Indian Chem. Soc., Vol. 40, pp. 885–888 (1963).
Kudryashova et al., Zhur. Obshch. Khim, Vol. 32, pp. 1182–1187 (1962).

*Primary Examiner*—Henry G. Jiles
*Assistant Examiner*—Harry I. Moatz
*Attorney*—Brumbaugh, Graves, Donohue & Raymond

[57] ABSTRACT

Compounds of the formula

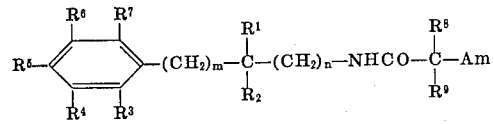

wherein $R^1$ and $R^2$ may be the same or different and selected form the class consisting of alkyl groups of one to three carbon atoms, including isopropyl, $R^3$, $R^4$, $R^5$, $R^6$ and $R^7$ may be the same or different and each selected from the class consisting of a hydrogen atom, straight and branched alkyl groups of one to three carbon atoms, straight and branched alkoxy groups of one to three carbon atoms and halogen atoms, at least two of $R^3$, $R^4$, $R^5$, $R^6$ and $R^7$ being hydrogen and at least one of $R^3$ and $R^7$ being hydrogen when $m$ is O; $R^8$ and $R^9$ may be the same or different and each selected from the class consisting of a hydrogen atom and straight and branched alkyl groups of one to three carbon atoms, or when $R^8$ is hydrogen $R^9$ may together with Am form a heterocyclic ring containing a nitrogen atom; Am is an amino group selected from the class consisting of pyrrolidino, piperidino, morpholino and monoalkylamino and dialkylamino groups in which the alkyl radicals are straight or branched and contain one to four carbon atoms; $m$ and $n$ is 0 or 1, at least one of $m$ and $n$ being 0; and therapeutically acceptable salts thereof, processes for their preparation, pharmaceutical preparations containing such compounds and their use as local anesthetics.

12 Claims, No Drawings

N-(PHENYLALKYL)-ACYLAMIDE DERIVATIVES

The present invention relates to new N-(phenylalkyl)-acylamides and their salts, processes for their preparation, the therapeutic use of such substances and pharmaceutical preparations containing at least one of these new compounds.

More particularly the present invention relates to new compounds of the formula

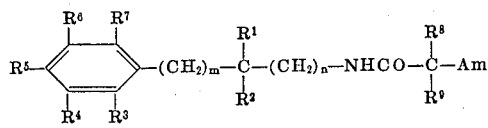

wherein $R^1$ and $R^2$ may be the same or different and selected from the class consisting of alkyl groups of one to three carbon atoms, including isopropyl, $R^3$, $R^4$, $R^5$, $R^6$ and $R^7$ may be the same or different and each selected from the class consisting of a hydrogen atom, straight and branched alkyl groups of one to three carbon atoms, straight and branched alkoxy groups of one to three carbon atoms and halogen atoms; $R^8$ and $R^9$ may be the same or different and each selected from the class consisting of a hydrogen atom and straight and branched alkyl groups of one to three carbon atoms, or when $R^8$ is hydrogen $R^9$ may together with Am form a heterocyclic ring containing a nitrogen atom; Am is an amino group selected from the class consisting of pyrrolidino, piperadino, morpholino and monoalkylamino and dialkylamino groups in which the alkyl radicals are straight or branched and contain one to four carbon atoms; $m$ and $n$ is 0 or 1, at least one of $m$ and $n$ being 0; and therapeutically acceptable salts thereof, processes for their preparation, pharmaceutical preparations containing such compounds and their use as local anesthetics.

The expression "therapeutically acceptable salt" is recognized in the art to designate an acid addition salt which is physiologically innocuous when administered in a dosage and at an interval (i.e., frequency of administration) that is effective for the indicated therapeutic use of the parent compound. Typical therapeutically acceptable addition salts of the compounds of formula I include but are not limited to the salts of mineral acids, such as hydrochloric, hydrobromic, phosphoric or sulphuric acid, organic acids, such as lactic, levulinic, citric, fumaric, maleic, succinic, tartaric and benzoic acid and sulphonic acids, such as methanesulphonic and sulphamic acid.

In the art of local anesthesia the introduction of the first clinically useful animoacylamide, lidocaine

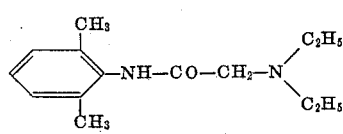

initiated efforts to synthesize aminoacylamides with even more favorable pharmacological properties. The investigations have been largely concerned with variations in the aromatic moiety of lidocaine whereas aralkylamines have been the subject of only a few investigations. The local anesthetic effect of 2-diethylamino-N-($\alpha$-methylbenzyl)-acetamide

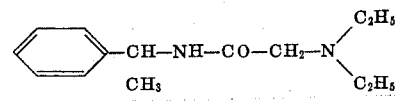

however, has been studied by N.J. Kudryashova, and N.V. Khromov-Borisov, Zhur. Obshch. Khin. 32, 1182, (1962) and found to show an activity below that of mesocaine.

We have now found that the new compounds of formula I are possessing more favorable pharmacological properties than the known N-(phenylalkyl)-acylamide above and that most of the new compounds have pharmacological properties comparable to or more favorable than lidocaine.

The compounds of the present invention may be prepared by a. reacting a compound of the formula $$A - NH_2 \qquad \qquad II$$

with an active ester, e.g. 2,4-di-nitrophenyl ester, p-nitro-phenyl ester or N-hydroxysuccinimide ester of the acid having the formula

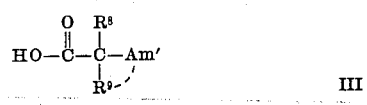

wherein A represents the moiety

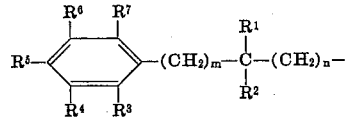

and in which formulas $R^1$, $R^2$, $R^3$, $R^4$, $R^5$, $R^6$, $R^7$, $R^8$, $R^9$, $m$ and $n$ are defined as above and Am' is equal to Am or a group convertible into Am by methods known per se, or with a functional equivalent of the active esters of formula III as an acylating agent for a primary amino group, whereafter, when Am' is not equal to Am, it is transformed into Am by methods known per se to the formation of a compound of formula I, b. reacting a compound of the formula $$A - NHMgHal \qquad \qquad IV$$

with a lower alkyl ester of a carboxylic acid of formula III, in which formulas A and Am' are defined as above and Hal means a halogen atom, preferably bromine, whereafter when Am' is not equal to Am, it is transformed into Am by methods known per se to the formation of a compound of formula I, c. reacting an isocyanate of the formula $$A - NCO \qquad \qquad V$$

with a carboxylic acid of formula III preferably in the presence of a condensing agent, in which formulas A and Am' are defined as above, whereafter, when Am' is not equal to Am, it is transformed into Am by methods known per se to the formation of a compound of formula I, d. reacting a compound of formula

   VI with a monohalogenated fatty acid of the formula

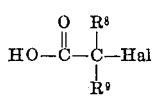   VII to the formation of a compound of the formula

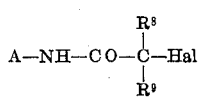   VIII which is then reacted with an amine of formula HAm to the formation of a compound of the formula

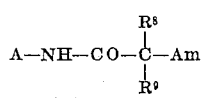   IX in which formulas A, $R^8$, $R^9$ and Am are as defined above, $Z^1$ is a monovalent hydrocarbon radical, preferably alkyl of at most four carbon atoms and Hal is a halogen atom, preferably chlorine, e. reacting a compound of the formula

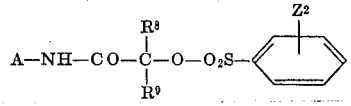   X with an amine of formula HAm in alkaline solution to the formation of a compound of formula IX, in which formulas A, $R^8$, $R^9$ and Am are as defined above and $Z^2$ represents hydrogen or an alkyl group of at most four carbon atoms, f. reacting a compound of the formula

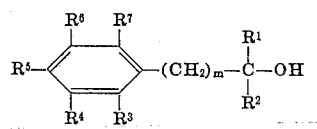   XI in strongly acidic media, e.g. concentrated sulphuric acid, benzenesulphonic acid, etc., with a cyanide of the formula

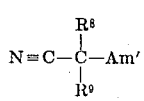   XII to the formation of a compound of the formula

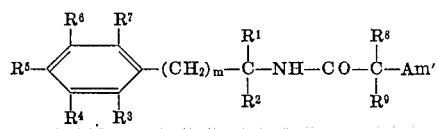   XIII wherein $R^1$ to $R^9$, m and Am' are as defined above, whereafter, when Am' is not equal to Am, it is transformed into Am by methods known per se to the formation of a compound of the formula I, g. reacting a compound of the formula

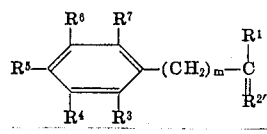   XIV in strongly acidic media, e.g. concentrated sulphuric acid, benzenesulphonic acid, etc., with a cyanide of formula XII to the formation of a compound of formula XIII, in which formulas $R^1$, $R^3$ to $R^9$, m and Am' are as defined above and $R^2$ is an alkylidene radical of one to three carbon atoms, h. reacting a compound of the formula

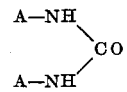   XV with a carboxylic acid of the formula

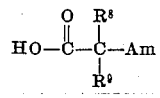   XVI to the formation of a compound of the formula

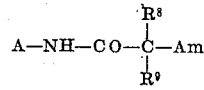   XVII wherein A, $R^8$, $R^9$ and Am are defined as above, i. reacting a salt of the formula

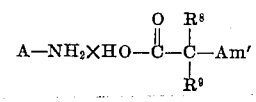   XVIII with a dehydrating agent, wherein A, $R^8$, $R^9$ and Am' are defined as above, whereafter, when Am' is not equal to Am, it is transformed into Am by methods known per se to the formation of a compound of formula I, j nitrosing a compound of the formula

   XIX wherein A is as defined above and $Z^3$ is an alkyl group of at most five carbon atoms, reducing the compound thus formed and coupling with a 1,3-trimethylene- or 1,4-tetramethylene dihalogenide to the formation of a compound of the formula

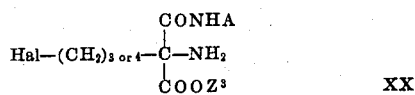  XX which is then ringclosed and decarboxylated by treatment with mineral acids, the compound thus formed is precipitated by alkali and alkylated to the formation of a compound of the formula

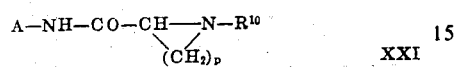  XXI wherein A is defined as above, p is 3 or 4 and $R^{10}$ is an alkyl group of at most six carbon atoms, or k. reacting a compound of the formula $ANH_2$ with a compound of the formula

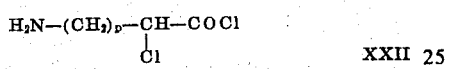  XXII ringclosing the compound thus formed by treatment with alkali solution to the formation of a compound of the formula

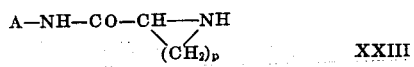  XXIII which is then alkylated to the formation of a compound of formula XXI, in which formulas A, p and $R^{10}$ are defined as above.

Functional equivalents to the active esters of the acid of formula III include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulphonic acids and of more hindered acids such as diphenylacetic acid. In addition, an acid azide or active thioester (e.g., with thiophenol, thioacetic acid), may be used or the free acid itself may be coupled with the amine of formula II by the use of a carbodiimide reagent. Another equivalent of the 2,4-dinitrophenyl and p-nitrophenyl esters is a corresponding azolide, i.e., an amide of the corresponding acid whose amide nitrogen is a member of a quasi-aromatic five-membered ring containing at least two nitrogen atoms, i.e., imidazole, pyrazole the triazoles, benzimidazole, benzotriazole and their substituted derivatives. Still another equivalent is a derivative obtained by reaction between a carboxylic acid of formula III and N-ethyl-5-phenyl-isoxazolium-3'-sulphonate.

The group Am' when not equal to Am may be a halogen atom, preferably chlorine, which is transformed into Am by reaction with an amine of formula HAm.

Compounds of formula I, wherein Am is a dialkylamino group may be obtained by reacting a compound obtained according to reaction a), b), c), or i) wherein Am' is amino or monoalkylamino with an alkylating agent, e.g., a dialkylsulphate. Such compounds may also be obtained from compounds wherein Am' is halogen atom by reaction with a compound of the formula

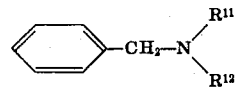

wherein $R^{11}$ and $R^{12}$ are alkyl groups of one to four carbon atoms, whereafter the quaternary compound of the formula

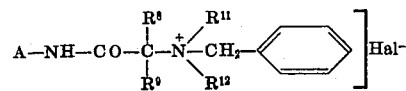 Hal⁻ thus formed, wherein A, $R^8$, $R^9$, $R^{11}$ and $R^{12}$ are defined as above and Hal means halogen, is hydrogenated in a solvent, preferably in an alcohol, in the presence of a catalyst to the formation of a compound of formula I, wherein

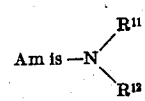

According to another embodiment of reaction a) a compound of formula II is reacted with an acid halogenide of formula III, wherein Am' is a quaternary group

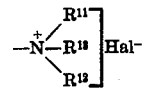 Hal⁻ wherein $R^{11}$, $R^{12}$ and Hal are defined as above and $R^{13}$ is an aralkyl group, preferably $C_6H_5$—$CH_2$— or $CH_3$—$C_6H_4$—$CH_2$—, to the formation of a compound of the formula

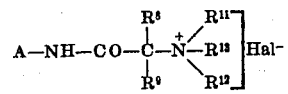 Hal⁻ wherein A, $R^8$, $R^9$, $R^{11}$, $R^{12}$, $R^{13}$ and Hal are defined as above, whereafter the group $R^{13}$ is split off by means of catalytic hydrogenation to the formation of a compound of formula I, wherein

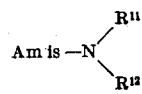

The group

may be a heterocyclic group

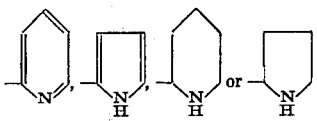

which may be transformed into the group

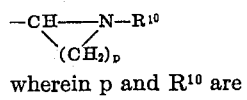

wherein p and $R^{10}$ are defined as above, by catalytic hydrogenation if necessary, and treatment with an alkylating agent, or when it is the group

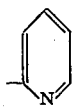

by treatment with an alkylating agent to quaternize the nitrogen atom in the heterocyclic ring, whereafter the pyridine nucleus is hydrogenated.

According to the preferred method for the preparation of a compound of the formula

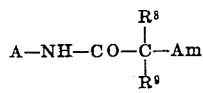

a compound formula II is reacted with a compound of the formula

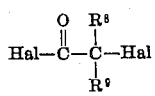

to the formation of a compound of the formula

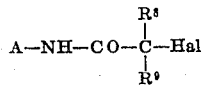

which is then reacted with an amine of formula HAm in which formulas A, $R^8$, $R^9$, Am and Hal are defined as above. Preferably Hal is chlorine or bromine.

In therapy the compounds of the present invention are administered in the form of a solution in a pharmaceutical carrier. The concentration is not important and widely varying concentrations are therapeutically effective. Typical solutions may contain from about 0.02 percent up to as high as about 10 percent by weight. The compounds according to the invention may be administered in the form of other pharmaceutical preparations such as suspensions, jellies, ointments or bases. In these preparations the compounds may be used in the form of their free bases or as addition salts or as both.

As is well known in the art, solutions of local anesthetics may be made isotonic by the addition of i.a. sodium chloride. Furthermore it is known in the art of local anesthesia that the anesthetic effectiveness may be improved by addition of a vasoconstrictor such as adrenaline, noradrenaline or octapressin.

The amount of local anesthetic which may be used varies widely, as is well known, depending upon the location and type of anesthesia required. The anesthetic effect, according to the present invention, is induced by applying an amount of N-(phenylalkyl)-acylamide solution, which is effective to produce the desired anesthesia.

Repeated applications at therapeutically effective intervals may be made, if desired, to obtain a prolonged effect.

It will be appreciated that certain of the compounds according to the present invention exist in the form of optically active isomers, which may be isolated in any principally known way for resolution of an amine, and it is understood that such a manner will be included within the scope of the present invention. The racemates obtained at the above reactions can be resolved into the enantiomeres by converting the free base into a salt or an amide of an optically active acid and regeneration of the amine after the usual separation of the diastereomeric mixture thus obtained.

It will also be understood that the optically active compounds of the present invention may be used either as a purified isomeric product obtained as a natural consequence of the reaction sequences described above or any reaction sequence for the preparation of the compounds which results in a mixed isomeric product containing the biologically active isomer or isomers.

For a further understanding of the present invention references may be given to the following examples.

Example 1. 2-Diethylamino-N-($\alpha,\alpha$-dimethylbenzyl)-acetamide hydrochloride.

$\alpha,\alpha$-Dimethylbenzylamine (13.5 g; 0.100 mole) was dissolved in toluene (100 ml), 10 percent sodium hydroxide (100ml) was added and the stirred mixture was cooled to $-5°$ C. Chloroacetyl chloride (19.9 g; 0.176 mole) was added dropwise during 5 minutes, whereupon the temperature rose to about 20° C. The crystalline 2-chloro-N-($\alpha,\alpha$-dimethylbenzyl)-acetamide precipitated within 30 minutes, was filtered off, washed on the filter with cold toluene and water, dried in vacuo and recrystallized from toluene after decolourizing with carbon.

Yield: 19.1 g (90.1 percent); m.p. 87°–89° C.

A solution of the aforementioned chloroacetamide (9.7 g; 0.046 mole) and diethylamine (8.7 g; 0.119 mole) in dry benzene (50 ml) was boiled under reflux for 5 hours. The reaction mixture was diluted with absolute ether (50 ml) and filtered to remove the diethylamine hydrochloride formed. The solution was extracted with 5 N hydrochloric acid, the aqueous phase was made alkaline with 5 N ammonia and extracted with benzene and chloroform.

The organic phase was dried over sodium sulphate and the solvents were removed in vacuo. The residual crude oil was distilled under vacuum affording an almost colourless, viscous liquid boiling at 125°C/0.10 mm Hg. Yield: 10.0 g. (87.8 percent).

The above liquid base, 2-diethylamino-N-($\alpha,\alpha$-dimethylbenzyl)-acetamide, was converted to a crystalline hydrochloride in the following way:

To a cooled solution of the base (5.0 g; 0.021 mole) in dry ether was added dropwise a slight excess of the required amount of hydrochloric acid dissolved in dry ether. The precipitated crude salt was dried under vacuum over phosphorous pentoxide and recrystallized from ethanol-ether. Yield: 5.3 g (92.6 percent), m.p. 93°–95L C. The total yield of 2-diethylamino-N-($\alpha,\alpha$-dimethylbenzyl)-acetamide hydrochloride starting from $\alpha,\alpha$-dimethylbenzylamine was thus 73.2 percent.

Example 2. N-($\alpha,\alpha$-Dimethylbenzyl)-2-n-propylaminoacetamide hydrochloride.

A solution of 2-chloro-N-($\alpha,\alpha$-dimethylbenzyl)-acetamide (9.5 g; 0.045 mole) (prepared as described in Example 1) and n-propylamine (7.3 g; 0.123 mole) in dry benzene (50 ml) was boiled under reflux for 5 hours. The reaction mixture was diluted with absolute ether (50 ml) and filtered to remove the n-propylamine hydrochloride formed. On attempted extraction of the product base from the ethereal phase with 5 N hydrochloric acid the crystalline N-($\alpha,\alpha$-dimethylbenzyl)-2-n-propyl-aminoacetamide hydrochloride precipitated, was filtered off, washed on the filter with dry ether and recrystallized from isopropanol Yield: 7.8 g (64.5 percent); m.p. 228°–229° C.

Example 3. N-($\alpha,\alpha$-Dimethylbenzyl)-2-piperidino-propionamide hydrochloride.

$\alpha,\alpha$-Dimethylbenzylamine (13.5 g; 0.100 mole) was dissolved in toluene (100 ml), 10 percent sodium hydroxide (100 ml) was added and the stirred mixture was cooled to −5° C. 2-Bromopropionyl bromide (38.0 g; 0.176 mole) was added dropwise during 5 minutes, whereupon the temperature rose to about 25° C. The crystalline 2-bromo-N-($\alpha,\alpha$-dimethylbenzyl)-propionamide precipitated within 10 minutes, was filtered off, washed on the filter with cold toluene and water, dried in vacuo and recrystallized from toluene after decolourizing with carbon.
Yield: 23.2 g (85.3 percent); m.p. 101°–102° C.

A solution of the aforementioned bromopropionamide (8.6 g; 0.032 mole) and piperidine (7.2 g; 0.085 mole) in dry benzene (35 ml) was boiled under reflux for 5 hours. The reaction mixture was worked up in analogy with the description in Example 1. The distilled oil, b.p. 124° C/0.05 mm Hg, crystallized in the cold. The colourless crystals of N-($\alpha,\alpha$-dimethylbenzyl)-2-piperidinopropionamide (7.7 g; 88.5 percent) melted at 59°–61° C.

The above solid base was converted quantitatively to a hydrochloride according to the method described in Example 1. The total yield of N-($\alpha,\alpha$-dimethylbenzyl)-2-piperidinopro-pionamide hydrochloride (m.p. 178°–180° C) starting from $\alpha,\alpha$-dime-thylbenzylamine was thus 75.4 percent.

Example 4. 2-n-Propylamino-N-($\alpha,\alpha$p-trimethylbenzyl)-acetamide hydrochloride.

2-chloro-N-($\alpha,\alpha$,p-trimethylbenzyl)-acetamide was prepared from $\alpha,\alpha$,p-trimethylbenzylamine in accordance with the method for the para-unsubstituted homolog described in Example 1.
Yield: 93.7 percent; m.p. 109°–110° C.

This chloroacetamide was reacted with n-propylamine and the formed product worked up as described in Example 2 to give the hydrochloride of 2-n-propylamino-N-($\alpha,\alpha$,p-trimethylbenzyl)-acetamide. Yield after recrystallization from ethyl methyl ketone: 57.5 percent; m.p. 189°–191° C.

When the acid mother liquor was made alkaline with 5 N ammonia and worked up as described in Example 1 a yield of 25.8 percent of distilled 2-n-propylamino-N-($\alpha,\alpha$,p-trimethylbenzyl)-acetamide (b.p. 136° C/ 0.03 mm Hg) was obtained.

The total yield of product (as base and hydrochloride) from $\alpha,\alpha$,p-trimethyl-benzylamine was thus 78.0 percent.

Example 5. 2-Pyrrolidino-N-($\alpha,\alpha$,p-trimethylbenzyl)-propionamide.

2-Bromo-N-($\alpha,\alpha$,p-trimethylbenzyl)-propionamide was prepared in analogy with the method described in Example 3. Yield 95.5 percent; m.p. 123°–124° C.

This bromopropionamide was reacted with pyrrolidine and the reaction mixture worked up as in Example 1. The distilled oil (b.p. 153° C/0.20 mm Hg) crystallized to 2-pyrrolidino-N-($\alpha,\alpha$,p-trimethylbenzyl)-propionamide. Yield: 85.0 percent; m.p. 60°–63 C. The total yield from $\alpha,\alpha$,p-trimethylbenzylamine: 81.1 %.

Example 6. 2-Diethylamino-N-($\alpha,\alpha$,m-trimethylbenzyl)-propionamide hydrochloride.

2-Bromo-N-($\alpha,\alpha$,m-trimethylbenzyl)-propionamide was prepared in analogy with the method in Example 3. Yield 90.4 percent; m.p. 108°–109° C.

This bromopropionamide was reacted with diethylamine and the formed product base (b.p. 128° C/0.05 mm Hg) was worked up and converted to the corresponding hydrochloride in the usual way (see Example 1).

The total yield of 2-diethylamino-N-($\alpha,\alpha$,m-trimethyl-benzyl)-propionamide hydrochloride (m.p. 160°–163° C) from $\alpha,\alpha$,m-trimethylbenzylamine was 71.6 percent.

Example 7. 2-Diethylamino-N-($\alpha,\alpha$-diethylbenzyl)-acetamide.

2-Chloro-N-($\alpha,\alpha$-diethylbenzyl)-acetamide was prepared from $\alpha,\alpha$-diethylbenzylanime in analogy with the method in Example 1. Yield: 89.4 percent; m.p. 106°–107° C.

This chloroacetamide was reacted with diethylamine and the formed product base (yield 74.0 percent, was worked up (b.p. 143° C/0.1 mm Hg) but it was not possible to convert it to the corresponding hydrochloride in the usual way. $n_D^{25}$ = 1.5066.

Example 8. N-($\alpha,\alpha$-Diethylbenzyl)-2-morpholinopropionamide.

2-Bromo-N-($\alpha,\alpha$-diethylbenzyl)-propionamide was prepared in analogy with the method in Example 3. Yield: 92.3 percent; m.p. 111°–113° C.

This bromopropionamide was reacted with morpholine and the formed product base (b.p. 172° C/0.1 mm Hg; m.p. 52°–55° C) was worked up in the usual way (see Example 1).

The total yield of N-($\alpha,\alpha$-diethylbenzyl)-2-morpholinopropionamide from $\alpha,\alpha$-diethylbenzylamine was 79.6 percent.

Example 9. 2-Diethylamino-N-($\alpha,\alpha$-dimethylphenethyl)-acetamide hydrochloride.

$\alpha,\alpha$-Dimethylphenethylamine (29.8 g; 0.200 mole) was dissolved in toluene (200 ml), 10 percent sodium hydroxide (200 ml) was added and the stirred mixture was cooled to −5° C. Chloroacetyl chloride (39.8 g; 0.352 mole) was added dropwise during 5 minutes, whereupon the temperature rose to about 20° C. As no precipitate was formed within 2 hours, the toluene phase was separated and the alkaline layer extracted with toluene. The combined toluene solutions were dried over sodium sulphate and the solvent was removed in vacuo affording a crystalline residue of 2-chloro-N-($\alpha,\alpha$-dimethylphenethyl)-acetamide. Yield after recrystallization from light petroleum: 86.6 percent; m.p. 60°–62° C.

A solution of the aforementioned chloroacetamide (5.5 g; 0.024 mole) and diethylamine (4.7 g; 0.064 mole) in dry benzene (25 ml) was boiled under reflux for 5 hours. The reaction mixture was diluted with absolute ether (25 ml) and filtered to remove the diethylamine hydrochloride formed. The solution was extracted with 5 N hydrochloric acid, the aqueous phase was made alkaline with 5 N ammonia and extracted with benzene and chloroform.

The organic phase was dried over sodium sulphate and the solvents were removed in vacuo. The residual crude oil was distilled under vacuum affording a colourless viscous liquid boiling at 128°–129° C/0.08 mm Hg. Yield: 5.0 g (78.1 percent).

The above liquid base, 2-diethylamino-N-($\alpha,\alpha$-dimethylphenethyl)-acetamide, was converted in the usual way (see Example 1) to the crystalline hydrochloride. Yield after recrystallization from acetone-ether: 97.0 percent; m.p. 124°–125° C.

The total yield of 2-diethylamino-N-($\alpha,\alpha$-dimethylphenethyl)-acetamide hydrochloride starting from $\alpha,\alpha$-dimethylphenethylamine was thus 65.7 percent.

Example 10. N-($\alpha,\alpha$,-Dimethylphenethyl)-2-piperidinoacetamide.

A solution of 2-chloro-N-($\alpha,\alpha$-dimethylphenethyl)-acetamide (5.5 g; 0.024 mole) (prepared as described in Example 9) and piperidine (5.5 g; 0.065 mole) in dry benzene (25 ml) was boiled under reflux for 5 hours.

The reaction mixture was worked up as described in Example 9. The product base (b.p. 114° – 115° C/0.03 mm Hg) solidified after distillation and was recrystallized from light petroleum. Yield 79.1 percent; m.p. 49°–50 C. The total yield of N-($\alpha,\alpha$-dimethylphenethyl)-2-piperidinoacetamide from $\alpha,\alpha$-dimethylphenethylamine was thus 68.5 percent.

Example 11. N-($\alpha,\alpha$-Dimethylphenethyl)-2-n-propylaminopropion-amide hydrochloride.

$\alpha,\alpha$-Dimethylphenethylamine (29.8 g; 0.200 mole) was dissolved in toluene (200 ml), 10 percent sodium hydroxide (200 ml), was added and the stirred mixture was cooled to −5° C. 2-Bromopropionyl bromide (76.0 g; 0.352 mole) was added dropwise during 5 minutes, whereupon the temperature rose to about 25° C. The crystalline 2-bromo-N-($\alpha,\alpha$-dimethylphenethyl)-propionamide precipitated immediately, was filtered off, washed on the filter with cold toluene and water, dried in vacuo and recrystallized from toluene after decolourizing with carbon. Yield: 91.1 percent; m.p. 105°–106° C.

A solution of the aforementioned bromopropionamide (7.0 g; 0.025 mole) and n-propylamine (3.8 g; 0.064 mole) in dry benzene (25 ml) was boiled under reflux for 5 hours. The reaction mixture was worked up as described in Example 2. The precipitated N-($\alpha,\alpha$-dimethylphenethyl)-2-n-propylaminopropionamide hydrochloride was recrystallized from isopropanol. Yield 69.4 percent; m.p. 191°–192° C. The total yield of product from $\alpha,\alpha$-dimethylphenethylamine was thus 63.2 percent.

Example 12. N-($\alpha,\alpha$-Dimethyl-p-chlorophenethyl)-2-n-propylaminoacetamide hydrochloride.

2-Chloro-N-($\alpha,\alpha$-dimethyl-p-chlorophenethyl)-acetamide was prepared from $\alpha,\alpha$-dimethyl-p-chlorophenethylamine in analogy with the method in Example 1. Yield: 94.6 percent; m.p. 99°–100° C. This chloroacetamide was reacted with n-propylamine and the formed product hydrochloride was worked up as described in Example 2.

The total yield of N-($\alpha,\alpha$-dimethyl-p-chlorophenethyl)--2-n-propylaminoacetamide hydrochloride (m.p. 191°–192° C) from $\alpha,\alpha$-dimethyl-p-chlorophenethylamine was 80.4 percent.

Example 13. N-($\alpha,\alpha$-Dimethyl-p-chlorophenethyl)-2-morpholinoacetamide.

A solution of 2-chloro-N-($\alpha,\alpha$-dimethyl-p-chlorophenethyl) acetamide (9.6 g; 0.037 mole) (prepared as described in Example 12) and morpholine (8.8 g; 0.101 mole) in dry benzene (40 ml) was boiled under reflux for 5 hours. The formed product base, which was worked up in the usual way (see Example 1) and solidified without distillation under vacuum, was recrystallized from light petroleum. The total yield of N-($\alpha,\alpha$-dimethyl-p--chlorophenethyl)-2-morpholinoacetamide (m.p. 86°–89° C) from $\alpha,\alpha$-dimethyl-p-chlorophenethylamine was 72.0 percent.

Example 14. Pipecolic and N'-n-butylpipecolic acid N-($\alpha,\alpha$--dimethylbenzyl)-amide.

$\alpha,\alpha$-Dimethylbenzylamine (22.4 g; 0.166 mole) was dissolved in toluene (150 ml), triethylamine (230 ml) was added and the stirred mixture heated to 55°C. Pipecolic acid chloride hydrochloride (36.4 g; 0.199 mole) was added in small portions during 1 hour, whereupon the temperature was kept at 55°–60° C. After a further period of 3 hours at the same temperature the reaction mixture was colled and the theoretical amount of triethylamine hydrochloride filtered off. The filtrate was mixed with water (300 ml) and the resulting suspension allowed to settle. The toluene layer was separated and the aqueous phase extracted with toluene and ether. The combined organic solutions were dried and evaporated in vacuo.

The residual crude oil was distilled twice under vacuum (b.p. 148°–149° C/0.05 mm Hg), dissolved in dry ether and filtered to remove undissolved impurities. The solvent was then evaporated affording a colourless oil [Yield: 7.3 g (29.7 %)].

The aforementioned pipecolic acid N-($\alpha,\alpha$-dimethylbenzyl)-amide (7.3 g; 0.029 mole) was dissolved in n-butanol (35 ml), potassium carbonate (3.5 g) and n-butylbromide (4.3 g; 0.031 mole) was added and the stirred mixture refluxed for 72 hours. The reaction mixture was filtered to remove inorganic salts and the filtrate evaporated in vacuo. The residue was taken up in diluted hydrochloric acid, the solution was washed with ether and made alkaline with ammonia. The alkaline phase was extracted with ether, the etheral solution dried over sodium sulphate, filtered, treated with carbon and evaporated in vacuo. The crude residue was distilled under vacuum, the fraction boiling at 139°C/0.1 mm Hg (3.1 g), which did not crystallize, was dissolved in dry ether and filtered to remove undissolved impurities (0.2 g). The basic product dissolved in the ethereal filtrate was converted to the corresponding hydrochloride, N'-n-butylpipecolic acid N-($\alpha,\alpha$-dimethylbenzyl)-amide hydrochloride [m.p. 203°–206° C (from acetone), yield: 2.4 g (73.9 percent)], in the usual way (see Example 1).

Example 15. 2-Diethylamino-N-(α,α-dimethylbenzyl)-acetamide.

To a stirred mixture of N,N-diethylaminoacetonitril (22.5 g; 0.200 mole) and concentrated sulphuric acid (32.0 g; 0.310 mole) kept at about 60°C a solution of α,α-dimethylbenzyl alcohol (13.6 g; 0.100 mole) in glacial acetic acid (150 ml) was added during 30 minutes.

Stirring was continued and temperature maintained at 60°–65° C for 5 hours and then at 20°C for 16 hours. The reaction mixture was then poured into ice-water, made alkaline with sodium carbonate and extracted with ether. The ethereal solution was washed with water and extracted with 5 N hydrochloric acid. The aqueous phase was made alkaline with sodium carbonate again extracted with ether, which after washing with water was dried over sodium sulphate. Evaporation of the ether afforded a light yellow oil, which was distilled under vacuum to yield a first fraction of unchanged N,N-diethylaminoacetonitril [12.3 g (54.6 ] and a second fraction consisting of 2-diethylamino-N-(α,α--dimethylbenzyl)-acetamide (b.p. 124°C/0.80 mm Hg), yield 0.7 g; 3.0 percent.

Example 16. 2-Dimethylamino-N-(α,α-dimethylbenzyl)-acetamide.

This compound was prepared by reacting 2-chloro-N-(α,α--dimethylbenzyl)-acetamide (see Example 1) (8.2 g; 0.039 mole) with dimethylamine (4.8 g; 0.106 mole) in benzene solution in a sealed tube at 90°C for 5 hours whereafter the reaction mixture was worked up in the usual way (see Example 1). After distillation under vacuum (b.p. 100°C/0.04 mm Hg) and recrystallization from petroleum ether the basic product melted at 44°–48° C. Yield: 6.8 g (80.0 percent).

The compounds according to Examples 17–99 listed in Tables 1,2 and 3 below were prepared by the preferred method, that is by reacting a compound of the formula

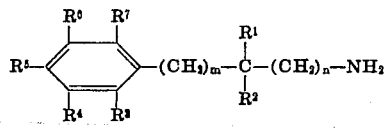

with a compound of the formula

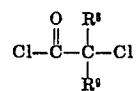

to the formation of a compound of the formula

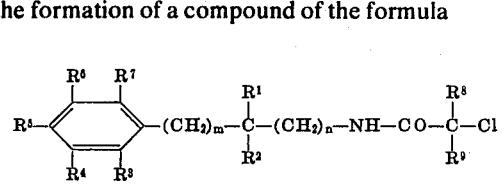

which is then reacted with an amine of the formula

HAm in which formulas $R^1$, $R^2$, $R^3$, $R^4$, $R^5$, $R^6$, $R^7$, $R^8$, $R^9$ and Am are as defined above. In the Tables are also indicated the pharmacological effects of some of the compounds of the present invention relative to lidocaine. The effects of the known substance 2-diethylamino-N-(α-methylbenzyl)-acetamide are also given.

The melting point given for the substances according to Examples 17–99 below generally refer to the hydrochloride of the base. However, the physical data given for the compounds according to Examples 19, 20, 23, 24, 28, 33, 35, 39, 41, 44, 48, 52, 54, 60, 61, 62, 63, 64, 65, 72, 75, 84, and 96, refer to the free base.

TABLE 1.—PHARMACOLOGICAL DATA OF COMPOUNDS OF THE FORMULA I RELATIVE TO LIDOCAINE (ON A MOLAR BASIS)

$R^1=R^2=CH_3$; m=n=0

| Example No. | M.p.,°C. B.p.,°C./ mm. Hg | $R^3$ | $R^4$ | $R^5$ | $R^6$ | $R^7$ | $R^8$ | $R^9$ | Am | Isolated nerve [1] | Topical anaesthesia [2] | Toxicity [3] I.v. | S.c. | Anaesthetic index [4] I.v. | S.c. |
|---|---|---|---|---|---|---|---|---|---|---|---|---|---|---|---|
| Lidocaine | | | | | | | | | | 1.0 | 1.0 | 1.0 | 1.0 | 1.0 | 1.0 |
| 2-diethylamino-N-(c-methylbenzyl)-acetamide | | | | | | | | | | 0.1 | 0.0 | 0.4 | 0.3 | 0.0 | 0.0 |
| 16 | | H | H | H | H | H | H | H | $N(CH_3)_2$ | 0.1 | | 0.9 | 0.5 | | |
| 1 | | H | H | H | H | H | H | H | $N(C_2H_5)_2$ | 0.4 | 0.6 | 0.4 | 0.3 | 1.5 | 2.0 |
| 2 | | H | H | H | H | H | H | H | NH–n-$C_3H_7$ | 0.3 | 0.8 | 0.4 | 0.3 | 2.0 | 2.7 |
| 17 | 176–177.5 | H | H | H | H | H | H | H |  | 0.1 | | 0.6 | 0.2 | | |
| 18 | 166–169 | H | H | H | H | H | H | H |  | 0.3 | 0.5 | 0.6 | 0.5 | 0.8 | 1.0 |
| 19 | 42.5–44.5 | H | H | H | H | H | H | H |  | | | 0.2 | 0.7 | | |
| 20 | 37–38 | H | H | H | H | H | H | $CH_3$ | $N(CH_3)_2$ | 0.2 | | 0.2 | 0.2 | | |
| 21 | 175–177 | H | H | H | H | H | H | $CH_3$ | $N(C_2H_5)_2$ | 0.7 | 0.9 | 0.4 | 0.4 | 2.3 | 2.3 |
| 22 | 158–167 | H | H | H | H | H | H | $CH_3$ | NH–n-$C_3H_7$ | 0.2 | 0.9 | 0.5 | 0.6 | 1.8 | 1.5 |
| 23 | 48–49.5 | H | H | H | H | H | H | $CH_3$ |  | 0.6 | | 0.5 | 0.5 | | |
| 3 | | H | H | H | H | H | H | $CH_3$ |  | 0.6 | 0.7 | 0.6 | 0.7 | 1.2 | 1.0 |
| 24 | 81–83 | H | H | H | H | H | H | $CH_3$ |  | | | 0.1 | 0.4 | | |
| 25 | 157–160 | $CH_3$ | H | H | H | H | H | H | $N(C_2H_5)_2$ | 0.6 | 1.7 | 0.6 | 0.6 | 2.8 | 2.8 |
| 26 | 253–255 | $CH_3$ | H | H | H | H | H | H | NH–n-$C_3H_7$ | 0.3 | 1.0 | 0.5 | 0.5 | 2.0 | 2.0 |
| 27 | 243 | $CH_3$ | H | H | H | H | H | $CH_3$ | $N(C_2H_5)_2$ | 0.4 | | | 0.7 | | |
| 28 | 46–48 | $CH_3$ | H | H | H | H | H | $CH_3$ | NH–n-$C_3H_7$ | 0.2 | | 0.5 | 0.4 | | |
| 29 | 93–100 | H | $CH_3$ | H | H | H | H | H | $N(C_2H_5)_2$ | 0.3 | 0.9 | 0.7 | 0.6 | 1.3 | 1.5 |
| 30 | 227–228 | H | $CH_3$ | H | H | H | H | H | NH–n-$C_3H_7$ | 0.2 | 0.9 | 0.7 | 0.5 | 1.3 | 1.8 |

Table I—Continued

| Example No. | M.p.,°C. B.p.,°C./ mm. Hg | R³ | R⁴ | R⁵ | R⁶ | R⁷ | R⁸ | R⁹ | Am | Isolated nerve [1] | Topical anaesthesia [2] | Toxicity [3] I.v. | S.c. | Anaesthetic index [4] I.v. | S.c. |
|---|---|---|---|---|---|---|---|---|---|---|---|---|---|---|---|
| 31 | 100–103 | H | CH₃ | H | H | H | H | H | N(pyrrolidine) | 0.1 | | 0.5 | 0.3 | | |
| 32 | 159–161 | H | CH₃ | H | H | H | H | H | N(piperidine) | 0.7 | 1.0 | 0.6 | 0.6 | 1.7 | 1.7 |
| 33 | 57–60 | H | CH₃ | H | H | H | H | H | N(morpholine) | | | 0.4 | 1.0 | | |
| 6 | | H | CH₃ | H | H | H | H | CH₃ | N(C₂H₅)₂ | 0.3 | 0.7 | 0.8 | 0.6 | 0.9 | 1.2 |
| 34 | 187–189 | H | CH₃ | H | H | H | H | CH₃ | NH—n-C₃H₇ | | | | 0.8 | | |
| 35 | 34–36 | H | CH₃ | H | H | H | H | CH₃ | N(pyrrolidine) | 0.3 | 0.5 | 0.7 | 0.5 | 0.7 | 1.0 |
| 36 | 123–125 | H | CH₃ | H | H | H | H | CH₃ | N(piperidine) | 0.6 | | 1.0 | 0.8 | | |
| 37 | 96–106 | H | CH₃ | H | H | H | H | CH₃ | N(morpholine) | 0.7 | 0.6 | 0.3 | 0.4 | 2.0 | 1.5 |
| 38 | 144–144.5 | H | H | CH₃ | H | H | H | H | N(C₂H₅)₂ | 0.7 | 1.0 | 0.7 | 0.4 | 1.4 | 2.5 |
| 4 | | H | H | CH₃ | H | H | H | H | NH—n-C₃H₇ | 1.0 | 0.6 | 0.8 | 0.6 | 0.8 | 1.0 |
| 39 | 65–66.5 | H | H | CH₃ | H | H | H | H | N(pyrrolidine) | 0.2 | 0.8 | 0.5 | 0.3 | 1.6 | 2.7 |
| 40 | 170–172 | H | H | CH₃ | H | H | H | H | N(piperidine) | 0.9 | 0.9 | 0.7 | 0.4 | 1.3 | 2.3 |
| 41 | 91–93 | H | H | CH₃ | H | H | H | H | N(morpholine) | | 0.4 | 0.3 | 1.3 | 1.3 | 0.3 |
| 42 | 178–179.5 | H | H | CH₃ | H | H | H | CH₃ | N(C₂H₅)₂ | 1.1 | 1.3 | 0.7 | 0.4 | 1.9 | 3.3 |
| 43 | 207.5–208.5 | H | H | CH₃ | H | H | H | CH₃ | NH—n-C₃H₇ | 1.3 | 1.1 | 0.8 | 0.9 | 1.4 | 1.2 |
| 5 | | H | H | CH₃ | H | H | H | CH₃ | N(pyrrolidine) | | 0.9 | 0.6 | 0.5 | 1.5 | 1.8 |
| 44 | 35.5–37 | H | H | CH₃ | H | H | H | CH₃ | N(piperidine) | 0.6 | 1.4 | 1.0 | 0.7 | 1.4 | 2.0 |
| 45 | 125–129 | H | H | CH₃ | H | H | H | CH₃ | N(morpholine) | 0.1 | 0.5 | 0.2 | 0.3 | 2.5 | 1.7 |
| 46 | 139–140 | CH₃ | H | H | CH₃ | H | H | H | N(C₂H₅)₂ | 0.6 | | 0.7 | 0.6 | | |
| 47 | 235–236 | CH₃ | H | H | CH₃ | H | H | H | NH—n-C₃H₇ | | | | | | |
| 48 | 45–47 | CH₃ | H | H | CH₃ | H | H | CH₃ | N(C₂H₅)₂ | | | | | | |
| 49 | 211–213 | CH₃ | H | H | CH₃ | H | H | CH₃ | NH—n-C₃H₇ | 0.4 | | 0.9 | 0.7 | | |
| 50 | 225–226 | CH₃ | H | CH₃ | H | CH₃ | H | H | N(C₂H₅)₂ | | | | | | |
| 51 | 209–210 | CH₃ | H | CH₃ | H | CH₃ | H | CH₃ | N(C₂H₅)₂ | | | | 0.8 | | |
| 14 | | H | H | H | H | H | (N-C₄H₉-piperidine) | | | | | 0.8 | | 1.9 | 1.2 |
| 52 | 134/0.02 | H | H | OCH₃ | H | H | H | H | N(C₂H₅)₂ | 0.1 | | 0.5 | 0.3 | | |
| 53 | 183–184 | H | H | OCH₃ | H | H | H | H | NH—n-C₃H₇ | 0.1 | | 0.5 | 0.5 | | |
| 54 | 49–51 | H | H | OCH₃ | H | H | H | H | N(pyrrolidine) | | | | 0.5 | | |
| 55 | 185–187 | H | H | OCH₃ | H | H | H | CH₃ | N(C₂H₅)₂ | 0.1 | | 0.6 | 0.4 | | |
| 56 | 182–183 | H | H | OCH₃ | H | H | H | CH₃ | NH—n-C₃H₇ | 0.4 | | 0.6 | 2.1 | | |
| 57 | 148–150 | H | H | OCH₃ | H | H | H | CH₃ | N(pyrrolidine) | 0.3 | | 1.0 | 0.6 | | |
| 58 | 122–124 | H | H | Cl | H | H | H | H | N(C₂H₅)₂ | 0.3 | 1.0 | 0.7 | 0.5 | 1.4 | 2.0 |
| 59 | 189–190 | H | H | Cl | H | H | H | H | NH—n-C₃H₇ | 0.6 | | 0.3 | 0.6 | | |
| 60 | 72–74 | H | H | Cl | H | H | H | H | N(pyrrolidine) | 0.5 | 0.7 | 0.5 | 0.5 | 1.4 | 1.4 |
| 61 | 76–78 | H | H | Cl | H | H | H | H | N(piperidine) | 0.7 | 1.8 | 0.5 | 1.4 | 3.6 | 1.4 |
| 62 | 95–97 | H | H | Cl | H | H | H | H | N(morpholine) | 0.4 | | 1.0 | 2.8 | | |
| 63 | 54–56 | H | H | Cl | H | H | H | CH₃ | N(C₂H₅)₂ | 0.7 | 1.0 | 0.8 | 0.5 | 1.3 | 2.0 |
| 64 | 52–53 | H | H | Cl | H | H | H | CH₃ | NH—n-C₃H₇ | 1.0 | 1.5 | 0.8 | 1.3 | 1.9 | 1.2 |

Table 1—Continued

| Example No. | M.p., °C. B.p., °C./ mm. Hg | R³ | R⁴ | R⁵ | R⁶ | R⁷ | R⁸ | R⁹ | Am | Isolated nerve [1] | Topical anaesthesia [2] | Toxicity [3] I.v. | Toxicity [3] S.c. | Anaesthetic index [4] I.v. | Anaesthetic index [4] S.c. |
|---|---|---|---|---|---|---|---|---|---|---|---|---|---|---|---|
| 65 | 84.5–86 | H | H | Cl | H | H | H | CH₃ | 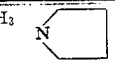 | 0.3 | 1.0 | 0.6 | 0.5 | 1.7 | 2.0 |
| 66 | 110–116 | H | H | Cl | H | H | H | CH₃ | 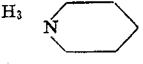 | 0.9 | 1.0 | 0.7 | 0.5 | 1.4 | 2.0 |
| 67 | 140–142 | H | H | Cl | H | H | H | CH₃ | 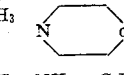 | 0.2 | | 0.2 | 0.3 | | |
| 68 | 55–60 | H | H | H | H | H | CH₃ | CH₃ | NH–n-C₃H₇ | | | | | | |

TABLE 2.—PHARMACOLOGICAL DATA OF COMPOUNDS OF THE FORMULA I RELATIVE TO LIDOCAINE (ON A MOLAR BASIS)

R¹ = R² = C₂H₅; m = n = 0
R³ = R⁴ = R⁵ = R⁶ = R⁷ = R⁸ = H

| Example No. | M.P., °C. | R⁹ | Am | Isolated nerve [1] | Topical anaesthesia [2] | Toxicity [3] I.v. | Toxicity [3] S.c. | Anaesthetic index [4] I.v. | Anaesthetic index [4] S.c. |
|---|---|---|---|---|---|---|---|---|---|
| 7 | | H | N(C₂H₅)₂ | 1.1 | 0.9 | 0.5 | 0.6 | 1.8 | 1.5 |
| 69 | 263–264 | H | NH–n-C₃H₇ | 0.5 | | | 0.7 | | |
| 70 | 154–156 | H | 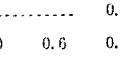 | 0.8 | 1.0 | 0.6 | 0.8 | 1.7 | 1.3 |
| 71 | 187–189 | H |  | 0.5 | 0.6 | 0.6 | 0.9 | 1.0 | 0.7 |
| 72 | 60–70 | H | 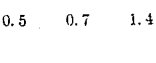 | 0.3 | 0.5 | 0.7 | 1.4 | 0.7 | 0.4 |
| 73 | 203–205 | CH₃ | N(C₂H₅)₂ | 0.3 | 0.9 | 1.0 | 1.5 | 0.9 | 0.6 |
| 74 | 70–90 | CH₃ | NH–n-C₃H₇ | 0.7 | 2.6 | 1.2 | 1.5 | 2.2 | 1.7 |
| 75 | 44–47 | CH₃ | 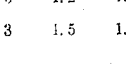 | 0.7 | 1.3 | 1.5 | 1.3 | 0.9 | 1.0 |
| 76 | 70–90 | CH₃ | 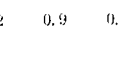 | 0.6 | 1.2 | 0.9 | 0.9 | 1.3 | 1.3 |
| 8 | | CH₃ | 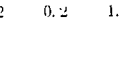 | 0.3 | 0.2 | 0.2 | 1.2 | 1.0 | 0.2 |
| Lidocaine | | | | 1.0 | 1.0 | 1.0 | 1.0 | 1.0 | 1.0 |

TABLE 3.—PHARMACOLOGICAL DATA OF COMPOUNDS OF FORMULA I RELATIVE TO LIDOCAINE (ON A MOLAR BASIS)

R¹ = R² = CH₃
R³ = R⁴ = R⁶ = R⁷ = R⁸ = H

| Example No. | M.P., °C. B.P., °C./ mm. Hg | m | n | R⁵ | R⁹ | Am | Isolated nerve [1] | Topical anaesthesia [2] | Toxicity [3] I.v. | Toxicity [3] S.c. | Anaesthetic index [4] I.v. | Anaesthetic index [4] S.c. |
|---|---|---|---|---|---|---|---|---|---|---|---|---|
| Lidocaine | | | | | | | 1.0 | 1.0 | 1.0 | 1.0 | 1.0 | 1.0 |
| 9 | | 1 | 0 | H | H | N(C₂H₅)₂ | 0.7 | 0.9 | 0.6 | 0.6 | 1.5 | 1.5 |
| 77 | 154–155 | 1 | 0 | H | H | NH–n-C₃H₇ | 0.9 | 1.6 | 1.0 | 1.2 | 1.6 | 1.3 |
| 78 | 181–182 | 1 | 0 | H | H | 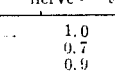 | 0.8 | 1.0 | 0.6 | 0.5 | 1.7 | 2.0 |
| 10 | | 1 | 0 | H | H | 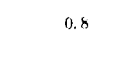 | 2.0 | 2.6 | 0.9 | 0.5 | 2.9 | 5.2 |
| 79 | 192–193 | 1 | 0 | H | H | 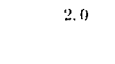 | 0.3 | 0.4 | 0.4 | 0.9 | 1.0 | 0.4 |
| 80 | 162–163 | 1 | 0 | H | CH₃ | N(C₂H₅)₂ | 0.9 | 1.0 | 0.8 | 0.7 | 1.3 | 1.4 |
| 11 | | 1 | 0 | H | CH₃ | NH–n-C₃H₇ | 0.8 | 1.1 | 1.2 | 1.1 | 0.9 | 1.0 |
| 81 | 132–133 | 1 | 0 | H | CH₃ | 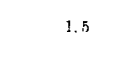 | 1.5 | 1.1 | 1.2 | 0.6 | 0.9 | 1.8 |
| 82 | 145–146 | 1 | 0 | H | CH₃ | 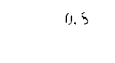 | 0.5 | 1.3 | 1.4 | 0.5 | 0.9 | 2.6 |
| 83 | 113–115 | 1 | 0 | H | CH₃ | 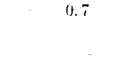 | 0.7 | | 0.3 | 0.6 | | |
| 84 | 170/0.6 | 1 | 0 | Cl | H | N(C₂H₅)₂ | 0.2 | 1.5 | 0.4 | 0.6 | 3.2 | 2.5 |
| 12 | | 1 | 0 | Cl | H | NH–n-C₃H₇ | 0.7 | 1.6 | 0.8 | 1.0 | 2.0 | 1.6 |

TABLE 3.—Continued

| Example No. | M.P.,°C. B.P.,°C./mm.Hg | m | n | R⁵ | R⁹ | Am | Isolated nerve [1] | Topical anaesthesia [2] | Toxicity [3] I.v. | Toxicity [3] S.c. | Anaesthetic index [4] I.v. | Anaesthetic index [4] S.c. |
|---|---|---|---|---|---|---|---|---|---|---|---|---|
| 85 | 185–186 | I | O | Cl | H | (pyrrolidine) | 0.9 | 1.9 | 0.7 | 0.6 | 2.7 | 3.2 |
| 86 | 144–145 | I | O | Cl | H | (piperidine) | 0.5 | 2.0 | 0.8 | 0.3 | 2.5 | 6.7 |
| 13 | | I | O | Cl | H | (morpholine) | 0.3 | 1.2 | 0.3 | ---- | 4.0 | -------- |
| 87 | 211–212 | I | O | Cl | $CH_3$ | $N(C_2H_5)_2$ | 0.8 | 3.0 | 0.9 | 1.1 | 3.3 | 2.7 |
| 88 | 221–222 | I | O | Cl | $CH_3$ | $NH$–n-$C_3H_7$ | 0.4 | 2.3 | 0.8 | 1.5 | 2.9 | 1.5 |
| 89 | 44–49 | I | O | Cl | $CH_3$ | (pyrrolidine) | 0.2 | 1.9 | 1.0 | 1.1 | 1.9 | 1.7 |
| 90 | 58–62 | I | O | Cl | $CH_3$ | (piperidine) | 0.5 | 2.1 | 1.0 | 0.4 | 2.1 | 4.2 |
| 91 | 109–111 | I | O | Cl | $CH_3$ | (morpholine) | 0.4 | ---- | 0.3 | ---- | ---- | ---- |
| 92 | 95–96 | O | I | H | H | $N(C_2H_5)_2$ | 0.7 | ---- | 0.6 | 0.9 | ---- | ---- |
| 93 | 197–199 | O | I | H | H | $NH$–n-$C_3H_7$ | ---- | ---- | ---- | 1.3 | ---- | ---- |
| 94 | 188–190 | O | I | H | $CH_3$ | $N(C_2H_5)_2$ | ---- | ---- | ---- | 1.0 | ---- | ---- |
| 95 | 182–184 | O | I | H | $CH_3$ | $NH$–n-$C_3H_7$ | 0.8 | ---- | 1.1 | 1.5 | ---- | ---- |
| 96 | 151–152 | O | I | $CH_3$ | H | $N(C_2H_5)_2$ | 0.6 | ---- | 0.5 | 0.5 | ---- | ---- |
| 97 | 224–226 | O | I | $CH_3$ | H | $NH$–n-$C_3H_7$ | 0.7 | ---- | 0.5 | 1.3 | ---- | ---- |
| 98 | 143.5–145.0 | O | I | $CH_3$ | $CH_3$ | $N(C_2H_5)_2$ | 0.5 | ---- | 0.5 | 0.7 | ---- | ---- |
| 99 | 190–192 | O | I | $CH_3$ | $CH_3$ | $NH$–n-$C_3H_7$ | 0.6 | ---- | 0.6 | 1.5 | ---- | ---- |

The tests were carried out according to the following list. Corresponding figures are given in the Tables.

1. Frog. Relative activity at 5 min incubation (5 m M solutions).
2. Rabbit cornea. 0.25 ml applied. Exposure time 0.5 min. Relative duration.
3. Toxicity relative to lidocaine on a molar basis. $LD_{50}$ for lidocaine:
   0.94 . $10^{-4}$ moles/kg i.v.
   0.93 . $10^{-3}$ moles/kg s.c.
4. Ratio between relative topical anesthetic activity and relative toxicity.

Compounds exhibiting particularly short onset, low degree of tissue toxicity, high frequency of anaesthesia, and long and reproducible duration of anaesthesia, are listed in Table 4 below:

TABLE 4

| Example | Structural formula |
|---|---|
| 1 | Phenyl–C($CH_3$)($CH_3$)–NHCOCH₂N($C_2H_5$)₂ |
| 26 | Phenyl–C($CH_3$)($CH_3$)–NHCOCH₂NHC₃H₇ |
| 37 | Phenyl–C($CH_3$)($CH_3$)–NHCOCHN(morpholine)($CH_3$) |
| 38 | H₃C–Phenyl–C($CH_3$)($CH_3$)–NHCOCH₂N($C_2H_5$)₂ |
| 60 | Cl–Phenyl–C($CH_3$)($CH_3$)–NHCOCH₂N(pyrrolidine) |
| 63 | Cl–Phenyl–C($CH_3$)($CH_3$)–NHCOCHN($C_2H_5$)($C_2H_5$) ($CH_3$) |
| 65 | Cl–Phenyl–C($CH_3$)($CH_3$)–NHCOCHN(pyrrolidine)($CH_3$) |
| 7 | Phenyl–C($C_2H_5$)($C_2H_5$)–NHCOCH₂N($C_2H_5$)₂ |
| 9 | Phenyl–C($CH_3$)($CH_3$)–CH₂NHCOCH₂N($C_2H_5$)₂ |
| 12 | Cl–Phenyl–CH₂–C($CH_3$)($CH_3$)–NHCOCH₂NH(CH₂)₂CH₃ |
| 13 | Cl–Phenyl–CH₂–C($CH_3$)($CH_3$)–NHCOCH₂N(morpholine) |
| 87 | Cl–Phenyl–CH₂–C($CH_3$)($CH_3$)–NHCOCH–N($C_2H_5$)₂ ($CH_3$) |
| 88 | Cl–Phenyl–CH₂–C($CH_3$)($CH_3$)–NHCO–CHNH(CH₂)₂CH₃ ($CH_3$) |
| 96 | H₃C–Phenyl–C($CH_3$)($CH_3$)–CH₂NHCOCH₂N($C_2H_5$)₂ |
| 99 | H₃C–Phenyl–C($CH_3$)($CH_3$)–CH₂NHCOCHNHC₃H₇ ($CH_3$) |

TABLE 4 – Continued

| Example | Structural formula |
|---|---|
| 17 | 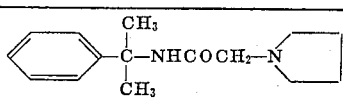 |

Of the compounds listed in Table 4, those according to Example 65, 13 and 12 exhibit an especially long duration of anaesthesia.

The following Examples will illustrate the preparation of pharmaceutical preparations containing substances of the invention.

Example 100. Injectable solution containing N-(α,α-dimethylphenethyl)-2-(diethylamino)-acetamide.

To 100 ml of hot, sterilized water 0.1 g of methyl p-hydroxybenzoate were added while stirring and heating. When all benzoate were dissolved 2 g of N-(α,α-dimethylphenethyl)--2-diethylamino)-acetamide hydrochloride and 0.6 g of sodium chloride were added while stirring. pH was adjusted to 7 by adding sodium hydroxide and sterilized water was added to 100 ml.

Example 101. Injectable solution containing N-(α,α-Dimethyl-p-chlorophenethyl)-2-n-propylaminoacetamide.

To 100 ml of hot, sterilized water 0.1 g of methyl p-hydroxybenzoate, 2 g of N-(α,α-dimethyl-p-chlorophenethyl)--2-n-propylaminoacetamide hydrochloride and 0.6 g of sodium chloride were added in the same way as described in Example 100, but the solution was protected from air-oxygen by working in nitrogen atmosphere. 0.05 g of sodium pyrosulphite were then dissolved, whereafter 1 mg of adrenaline was added. pH was adjusted to 4 by adding sodium hydroxide and sterilized water was added to 100 ml.

Example 102. Pharmaceutical jelly containing N-(α,α-dimethyl-p-chlorophenethyl)-2-morpholinoacetamide.

To 80 ml of distilled water 0.5 g of N-(α,α-dimethyl-p-chlorophenethyl)-2-morpholinoacetamide were added. To this solution 4 g of methylcellulose were added while stirring and when all methylcellulose was dissolved a solution of 50 mg of chlorhexidine diglyconate in 10 ml of water was added and the volume was adjusted to 100 ml by addition of distilled water.

Example 103. Pharmaceutical ointment containing 2-morpholino-N-(α,α-m-trimethylbenzyl)-propionamid.

Equal amounts (27 g of each) of polyethyleneglycol 300 and polyethyleneglycol 1540 were melted together with 19 g of polyethyleneglycol 3000 at 60°C. Then 25 g of propyleneglycol and finally 2 g of 2-morpholino-N-(α,α,m-trimethylbenzyl)-propionamide were added. and the ointment was homogenized.

What is claimed is:

1. The compound of the formula

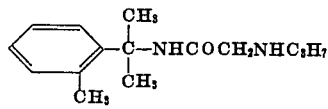

and therapeutically acceptable salts thereof.

2. The compound of the formula

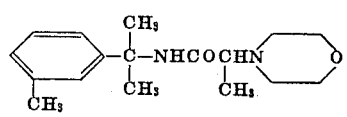

and therapeutically acceptable salts thereof.

3. The compound of the formula

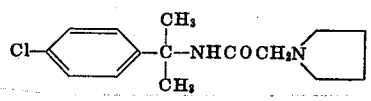

and therapeutically acceptable salts thereof.

4. The compound of the formula

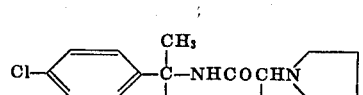

and therapeutically acceptable salts thereof.

5. The compound of the formula

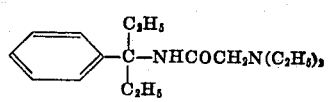

and therapeutically acceptable salts thereof.

6. The compound of the formula

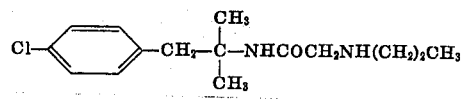

and therapeutically acceptable salts thereof.

The compound of the formula

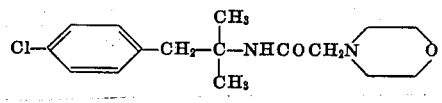

and therapeutically acceptable salts thereof.

8. The compound of the formula

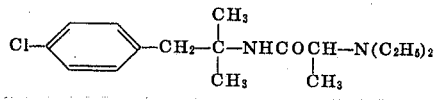

and therapeutically acceptable salts thereof.

9. The compound of the formula

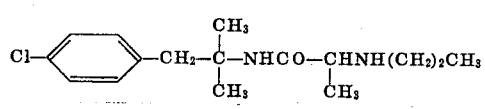

and therapeutically acceptable salts thereof.

10. The compound of the formula

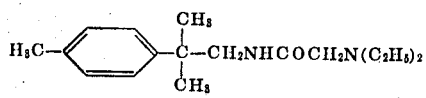

and therapeutically acceptable salts thereof.

11. The compound of the formula

23
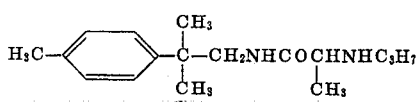
and therapeutically acceptable salts thereof.
12. The compound of the formula
24
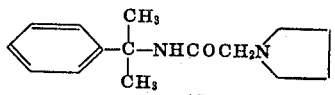
and therapeutically acceptable salts thereof.
* * * * *

UNITED STATES PATENT OFFICE
CERTIFICATE OF CORRECTION

Patent No. 3,692,784        Dated September 19, 1972

Inventor(s) Ulf Henrik Anders Lindberg

It is certified that error appears in the above-identified patent and that said Letters Patent are hereby corrected as shown below:

Page 1, col. 2, In the abstract (formula), change

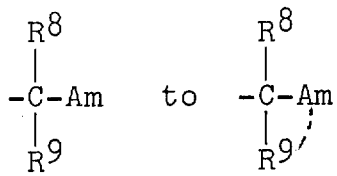

Page 1, col. 2, line 2 after the formula, change "form" to -- from --;

Col. 4, line 26, change "$R^2$" to -- $R^{2'}$ --;

Col. 7, line 32, change "compound formula" (first occurrence) to -- compound of formula --;

Col. 9, line 2, change "93°-95 L C." to -- 93-95°C --;

Col. 9, line 48, change "α,α-dime-thylbenzylamine" to -- α,α - dimethylbenzylamine --;

Col. 13, line 19, change "[12.3g (54.6%]" to -- [12.3g (54.6%) ] -- .

Signed and sealed this 20th day of November 1973.

(SEAL)
Attest:

EDWARD M. FLETCHER, JR.          RENE D. TEGTMEYER
Attesting Officer                Acting Commissioner of Patents